Patented Apr. 20, 1954

2,676,158

UNITED STATES PATENT OFFICE 2,676,158

MIXED ESTERS OF PHENOLIC RESINS

Malcolm M. Renfrew, Minneapolis, Minn., assignor to General Mills, Inc., a corporation of Delaware No Drawing. Application February 21, 1952, Serial No. 272,897

9 Claims. (Cl. 260—19)

The present invention relates to phenolic resins which have been esterified with a mixture of higher unsaturated fatty acids and substituted or unsubstituted benzoic acid. Phenolic resin esters of higher unsaturated fatty acids are drying oils which possess desirable properties. It has now been discovered that when phenolic resins are esterified with a mixture of higher unsaturated fatty acids and substituted or unsubstituted benzoic acid, the resultant product is a drying oil which possesses a faster drying rate and produces films of increased hardness.

It is therefore an object of the present invention to provide phenolic resins esterified with a mixture of higher unsaturated fatty acids and substituted or unsubstituted benzoic acid.

The phenol-formaldehyde resins employed in the present invention may be derived from phenol or from substituted phenols, particularly phenols substituted with aliphatic or aromatic hydrocarbon groups, such as para-tertiary-butylphenol and ortho- and para-phenylphenols. The resins contain from about 4 to about 10 phenolic groups per resin molecule, and are derived by acid catalyzed condensation. The resins are preferably substantially free from methylol groups, or at most contain only a few such groups so that there is no substantial increase in the molecular weight of the resin due to further condensation during subsequent esterification. The resins of this type may be formed from phenol itself by condensing from 2 to 3 mols of formaldehyde per 4 mols of phenol in the presence of an acid catalyst. In the preparation of resins from the substituted phenols, either an equivalent amount or an excess of formaldehyde may be employed.

The resins may be formed under the usual acid catalyzed conditions. After the resin reaction is completed, any excess phenol and any low molecular weight condensation products, such as those containing 2 or 3 phenolic nuclei, may be removed by stripping them from the reaction mixture at temperatures of from 250–325° C. at a high vacuum, for example, at an absolute pressure of from 2 to 10 mm. of mercury.

The phenolic resins are esterified by a mixture of drying or semi-drying oil acids having from 8 to 18 carbon atoms, and a benzoic acid. The phenolic resins are esterified to a degree such that from 80–100% of the phenolic hydroxyl groups are esterified. Of the hydroxyl groups esterified, from 5–20% are esterified with a benzoic acid. Preferably from 10–20% of the total esterified hydroxyl groups are esterified with a benzoic acid.

The unsaturated higher fatty acids employed for esterification contain from 8 to 18 carbon atoms and may be the mixed acids of a drying or semi-drying oil, such as the mixed acids of soybean oil, linseed oil, tung oil, perilla oil, oiticica oil, and the like. They may likewise be selected fractions of the acids of such oils, or isolated fatty acids of such oils which have drying or semi-drying characteristics. In general, it is desired to employ acids having an iodine number of at least 100 and preferably at least 110.

As the benzoic acid, there may be employed either benzoic acid itself or a wide variety of substituted benzoic acids, particularly the benzoic acids substituted with an aliphatic or an aromatic hydrocarbon group. Typical benzoic acids which may be used include p-tert-butylbenzoic acid, ethyl benzoic acid, toluic acid, biphenyl carboxylic acid, and the like.

Since benzoic acid and the substituted benzoic acids react somewhat more slowly than the unsaturated fatty acids, it is preferred to employ a somewhat larger quantity of them than is desired in the ultimate product. The excess of the benzoic acid, and likewise any excess of unsaturated fatty acids, may be removed by stripping.

Example 1

A para-tertiary-butylphenol-formaldehyde resin was prepared from approximately equimolecular amounts of para-tertiary-butylphenol and formaldehyde in the presence of a small quantity of oxalic acid as catalyst. The reaction was carried out in an autoclave at a temperature of 160° C. for 5 hours. Thereafter the reaction mixture was stripped to about 310° C. at a pressure of approximately 0.1 mm. of mercury.

162 grams of the above resin, 224 g. of distilled soybean oil fatty acids, 36 g. para-tertiary-butylbenzoic acid, 3 g. of triphenyl phosphite, and 50 cc. of xylene were refluxed and agitated at 260° C. for 12 hours under a Stark and Dean tube. 17.4 cc. of water were collected. The solvent was then evaporated and the product was stripped to 275° C. at 150µ. A portion of the residue was made into a 60% solution in mineral spirits, to which was added lead and cobalt driers. Films cast from this solution were tack free to foil in 8 hours, and had a Sward hardness in 24 hours of 26. In comparison, an ester of the same resin with soybean oil acids exclusively dried tack free to foil overnight and had a Sward hardness of 8 in 24 hours.

Example 2

162 grams of the para-tertiary-butylphenol-formaldehyde resin prepared as above described except that it was reacted in the autoclave for 3 hours, 252 g. of distilled soybean oil acids, 54 g. of para-tertiary-butylbenzoic acid, 3 g. triphenyl phosphite, and 50 cc. of xylene were refluxed and agitated under a Stark and Dean tube at 260° C. for 6 hours. The solvent was evaporated and the product was then stripped to 260° C. at 40μ. A portion of the residue was made up into a 60% solution in mineral spirits, to which was added cobalt and lead driers. Films were cast from this solution and dried tack free to foil in 8½ hours and had a Sward hardness of 16 in 24 hours. An ester was made from the same resin using distilled soybean acids exclusively and the film cast from this ester dried tack free to foil overnight and had a Sward hardness of 10 in 24 hours.

Example 3

162 grams of the resin of Example 2, 224 g. of soybean oil fatty acids, 55 g. of benzoic acid, 4 g. of triphenyl phosphite, and 50 cc. of xylene were agitated and refluxed under a Stark and Dean tube at 260° C. for 12 hours. The product was evaporated and stripped to 260° C. at 250μ. A 60% solution in mineral spirits was prepared containing .3% Pb and .06% Co as naphthenates. The solution was applied on tubes and plates and the films dried to no transfer in less than 45 minutes; dried through in less than 2 hours; were tack free to foil in 7 hours; hardness in 24 hours, 28.

The use of the benzoic acids as part of the esterifying acids may be applied to phenolic resins in general, including those derived from unsubstituted phenol, as well as those derived from other substituted phenols, such as ortho- and para-phenyl-phenol.

I claim as my invention:

1. A phenol-formaldehyde resin with 80% to 100% of the hydroxyl groups esterified by means of a mixture of unsaturated higher fatty acids containing from 8-18 carbon atoms and a benzoic acid selected from the group consisting of benzoic acid and hydrocarbon substituted benzoic acids, from 5% to 20% of the total esterified hydroxyl groups being esterified with a benzoic acid.

2. A para-tertiary-butylphenol-formaldehyde resin with 80% to 100% of the hydroxyl groups esterified by means of a mixture of unsaturated higher fatty acids containing from 8-18 carbon atoms and a benzoic acid selected from the group consisting of benzoic acid and hydrocarbon substituted benzoic acids, from 5% to 20% of the total esterified hydroxyl groups being esterified with a benzoic acid.

3. A para-tertiary-butylphenol-formaldehyde resin substantially completely esterified with a mixture of unsaturated higher fatty acids containing from 8-18 carbon atoms and a benzoic acid selected from the group consisting of benzoic acid and hydrocarbon substituted benzoic acids, from 5% to 20% of the hydroxyl groups being esterified with a benzoic acid.

4. A phenol-formaldehyde resin with 80% to 100% of the hydroxyl groups esterified by means of a mixture of unsaturated higher fatty acids containing from 8-18 carbon atoms and benzoic acid, from 5% to 20% of the total esterified hydroxyl groups being esterified with benzoic acid.

5. A para-tertiary-butylphenol-formaldehyde resin with 80% to 100% of the hydroxyl groups esterified by means of a mixture of unsaturated higher fatty acids containing from 8-18 carbon atoms and benzoic acid, from 5% to 20% of the total esterified hydroxyl groups being esterified with benzoic acid.

6. A para-tertiary-butylphenol-formaldehyde resin substantially completely esterified with a mixture of unsaturated higher fatty acids containing from 8-18 carbon atoms and benzoic acid, from 5% to 20% of the hydroxyl groups being esterified with benzoic acid.

7. A phenol-formaldehyde resin with 80% to 100% of the hydroxyl groups esterified by means of a mixture of unsaturated higher fatty acids containing from 8-18 carbon atoms and para-tertiary-butylbenzoic acid, from 5% to 20% of the total esterified hydroxyl groups being esterified with para-tertiary-butylbenzoic acid.

8. A para-tertiary-butylphenol-formaldehyde resin with 80% to 100% of the hydroxyl groups esterified by means of a mixture of unsaturated higher fatty acids containing from 8-18 carbon atoms and para-tertiary-butylbenzoic acid, from 5% to 20% of the total esterified hydroxyl groups being esterified with para-tertiary-butylbenzoic acid.

9. A para-tertiary-butylphenol-formaldehyde resin substantially completely esterified with a mixture of unsaturated higher fatty acids containing from 8-18 carbon atoms and para-tertiary-butylbenzoic acid, from 5% to 20% of the hydroxyl groups being esterified with para-tertiary-butylbenzoic acid.

References Cited in the file of this patent

UNITED STATES PATENTS

| Number | Name | Date |
| --- | --- | --- |
| 2,044,859 | Seebach | Apr. 16, 1935 |
| 1,998,098 | Seebach | June 23, 1936 |